(12) United States Patent
Ekambaram et al.

(10) Patent No.: US 10,592,304 B2
(45) Date of Patent: Mar. 17, 2020

(54) SUGGESTING APPLICATION PROGRAMMING INTERFACES BASED ON FEATURE AND CONTEXT ANALYSIS

(71) Applicant: International Business Machines Corporation, Armonk, NY (US)

(72) Inventors: Vijay Ekambaram, Bangalore (IN); Senthil Mani, Bangalore (IN); Giriprasad Sridhara, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 15/348,182

(22) Filed: Nov. 10, 2016

(65) Prior Publication Data

US 2018/0129544 A1   May 10, 2018

(51) Int. Cl.
   *G06F 9/54*   (2006.01)
   *G06F 16/30*  (2019.01)
(52) U.S. Cl.
   CPC .............. *G06F 9/541* (2013.01); *G06F 16/30* (2019.01)
(58) Field of Classification Search
   None
   See application file for complete search history.

(56) References Cited

U.S. PATENT DOCUMENTS

| | | | |
|---|---|---|---|
| 9,015,730 B1 * | 4/2015 | Allen | |
| 2015/0095923 A1 | 4/2015 | Sarid | |
| 2015/0378692 A1 * | 12/2015 | Dang | |
| 2016/0335168 A1 | 11/2016 | Freiberg et al. | |
| 2017/0068408 A1 | 3/2017 | Gauci et al. | |

OTHER PUBLICATIONS

Heinemann et al., Identifier-Based Context-Dependent API Method Recommendation, cqse.edu, 2012.
Thung et al., Automatic Recommendation of API Methods from Feature Requests, IEEE, 2013.
Asaduzzaman et al., Context-Sensitive Code Completion Tool for Better API Usability, IEEE, 2014.
Duala-Ekoko et al., Using Structure-Based Recommendations to Facilitate Discoverability in APIs, cs.mcgill, 2011.

(Continued)

*Primary Examiner* — Syed A Roni
(74) *Attorney, Agent, or Firm* — Ryan, Mason & Lewis, LLP (57) ABSTRACT

Methods, systems, and computer program products for suggesting application programming interfaces (APIs) based on feature and context analysis are provided herein. A computer-implemented method includes extracting at least one feature of an input function code based on application of one or more text analytics to one or more inputs pertaining to the input function code; deriving at least one item of context-related information from the input function code; generating a suggestion comprising one or more application programming interfaces, wherein said generating comprises comparing (i) the at least one feature of the input function code and (ii) the at least one item of context-related information to a database, and wherein the database comprises (a) feature data and (b) context-related information pertaining to multiple application programming interfaces; and outputting the suggestion to at least one user.

16 Claims, 5 Drawing Sheets

(56) References Cited

OTHER PUBLICATIONS

Searchcode, https://searchcode.com/about/, Sep. 22, 2016.
Sridhara et al. Towards Automatically Generating Summary Comments for Java Methods. Proceedings of the IEEE/ACM International Conference on Automated Software Engineering, 2010.
Wikipedia, Method (computer programming), https://en.wikipedia.org/w/index.php?title=Method_(computer_programming)&oldid=744306634, Oct. 14, 2016.
Wikipedia, Comment (computer programming), https://en.wikipedia.org/w/index.php?title=Comment_(computer_programming)&oldid=748687165, Nov. 9, 2016.
Cheng Zhang et al., "Automatic Parameter Recommendation for Practical API Usage", 34th International Conference on Software Engineering (ICSE), 2012, IEEE.

* cited by examiner

SUGGESTING APPLICATION PROGRAMMING INTERFACES BASED ON FEATURE AND CONTEXT ANALYSIS

FIELD

The present application generally relates to information technology, and, more particularly, to application programming interface (API) technology.

BACKGROUND

Automation of API suggestions can provide efficiency and time-saving benefits. Existing approaches, such as, for example, auto-fill or auto-complete techniques, include generating suggestions of possible APIs based on the initial letters typed for an API call. However, such approaches often produce irrelevant suggestions, thereby precluding any efficiency benefits.

SUMMARY

In one embodiment of the present invention, techniques for suggesting APIs based on feature and context analysis are provided. An exemplary computer-implemented method can include extracting at least one feature of an input function code based on application of one or more text analytics to one or more inputs pertaining to the input function code; deriving at least one item of context-related information from the input function code; generating a suggestion comprising one or more application programming interfaces, wherein generating comprises comparing (i) the at least one feature of the input function code and (ii) the at least one item of context-related information to a database, and wherein the database comprises (a) feature data and (b) context-related information pertaining to multiple application programming interfaces; and outputting the suggestion to at least one user.

In another embodiment of the invention, an exemplary computer-implemented method can include automatically identifying one or more features from each of multiple function codes, wherein each of the multiple function codes is associated with a particular application programming interface. Such a method can also include automatically identifying one or more items of context-related information pertaining to each of the multiple function codes, and generating a database by storing (i) the one or more identified features and (ii) the one or more identified items of context-related information. Additionally, such a method can include extracting at least one feature of an input function code based on application of one or more text analytics to one or more inputs pertaining to the input function code, and deriving at least one item of context-related information from the input function code. Further, such a method can also include generating a suggestion comprising one or more application programming interfaces, wherein generating comprises comparing (i) the at least one feature of the input function code and (ii) the at least one item of context-related information to the generated database, and outputting the suggestion to at least one user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes suggesting APIs based on feature and context analysis. At least one embodiment of the invention can include automatically suggesting APIs and/or updating API suggestions by analyzing similar API repositories based on context information and one or more features of a programming function code. By way of example, "context information," as used herein, can include variables in the current method (function), variables in the current class, etc. Additionally, "features," as used herein, refers to the functionality desired to be implemented by the method (function). For example, the desired functionality of a method can be to add a student to an existing database of students.

Also, at least one embodiment of the invention can include applying text analytics to the comments and method name to extract one or more features of the function ($F_i$) and context information pertaining to the function code ($C_i$) to be coded in the method space. For example, given an input such as "list the students in class," one or more embodiments of the invention can include extracting the action, "list," and the arguments, "students" and "class." Subsequently, such an embodiment can include searching one or more API repositories for a matching action and matching arguments, thereby narrowing the potential number of APIs to be suggested.

Additionally, at least one embodiment of the invention can include recommending one or more related APIs, as well as snippets associated with those APIs, based on the function code ($C_i$) and the function ($F_i$). Such recommendations can be generated by searching one or more API repositories, and the snippets can be presented and/or suggested when the user clicks on the recommended APIs. Moreover, the snippets can contain, for example, surrounding data manipulations, dependent APIs as well as plumbing code. Further, at least one embodiment of the invention can include dynamically updating the API recommendations based on one or more codes typed into the method space.

By way of example, consider code to compute the area of a rectangle such as "area=length*breadth." In such an example, "surrounding data manipulations" can include the code assigning values to the "length" and "breadth" variables, such as length=getInputFromUser( ), and breadth=getInputFromUser( ). Further, suppose a user is shown an example snippet of generic code, and it is desired to replace this generic code with specifics from the user's code. Such a scenario is what is meant herein by "plumbing code."

As additionally detailed herein, one or more embodiments of the invention include implementing text analytics, which includes applying natural language processing to an input to determine the "action" and the arguments" (of the action) present in the input. As noted above, such an embodiment can include, given an input of "list the students in class," identifying the action, "list," and the arguments, "students" and "class." Accordingly, at least one embodiment of the invention includes utilizing both the code and the semantics from the code and the comments. Also, such an embodiment can include applying natural language processing to code statements. For example, given a statement such as "array. toList( )," such an embodiment can include inferring that the action is "convert." Such an inference can be made by studying leading comments across a number of such methods to determine that the action is "convert." Alternately, such an inference can be made by building a human knowledge base wherein "to" means "convert," etc.

Further, in connection with one or more embodiments of the invention, natural language program analysis can be implemented. By way of illustration, programming commonly involves around classes and methods. In natural language, classes are typically nouns and methods are actions on entities. For example, consider the statement "startEngine, shiftGear, applyAccelerator, applyBrake." With respect to such a statement, "Start," "shift," and "apply" are actions (verbs), while "Engine," "Gear," "Accelerator," and "Brake" are objects on which the action is performed. Such objects can be referred to as the "direct objects" or "theme" of the "action."

As described below in connection with FIG. 1, at least one embodiment of the invention can include, based on the text input and/or mentioned in the comments and the method name, suggesting one or more suitable and/or relevant APIs in a side editor. Additionally, as the user continues to type code into the method space, such an embodiment can, based on the context of the user code, update the list of one or more suggested APIs. Based on such user input and/or code changes, relevant and/or related APIs can be added to the suggested list, and irrelevant and/or unrelated APIs can be removed from the suggested list. Further, when the user clicks on any API from the suggested list, one or more embodiments of the invention can include recommending one or more related code snippets with respect to the given API, based on the current code state and feature to be coded (which is retrieved from comments and method name).

Figure 1:
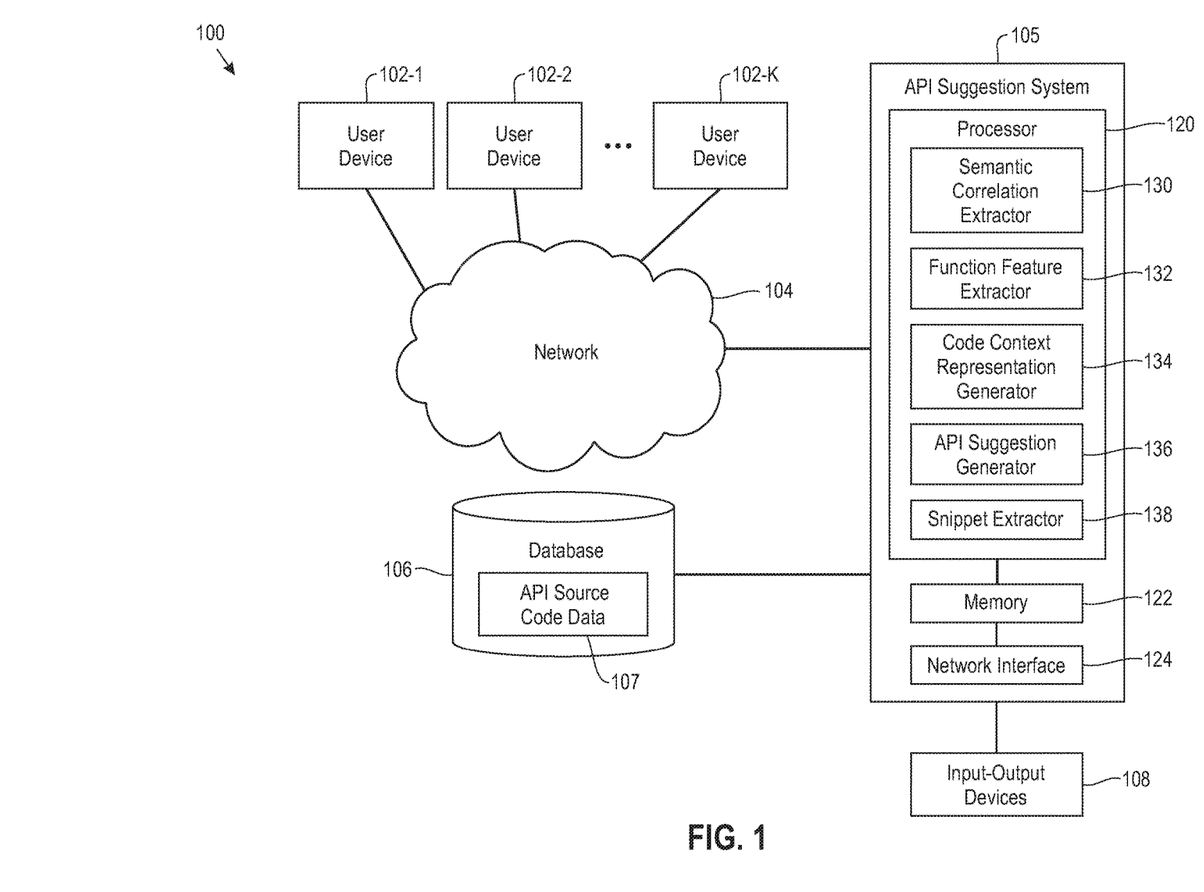
FIG. 1 is a block diagram of a computer network configured for suggesting one or more APIs in an illustrative embodiment of the invention.

FIG. 1 is a block diagram of a computer network configured for suggesting one or more APIs in an illustrative embodiment of the invention. By way of illustration, FIG. 1 depicts a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is an API suggestion system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks each comprising processing devices configured to communicate using internet protocol (IP) or other related communication protocols.

The network security system 105 has an associated database 106. The database 106 more particularly stores API source code data 107.

The database 106 in the present embodiment is implemented using one or more storage systems associated with the API suggestion system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the API suggestion system 105 are input-output devices 108, which illustratively comprise keyboards, displays or other types of input-output devices in any combination. Such input-output devices are used to support one or more user interfaces to the API suggestion system 105, as well as to support communication between the API suggestion system 105 and other related systems and devices not explicitly shown.

The API suggestion system 105 in the FIG. 1 embodiment is assumed to be implemented using at least one processing device. Each such processing device generally comprises at least one processor and an associated memory, and implements one or more functional modules for controlling certain features of the API suggestion system 105.

More particularly, the API suggestion system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the API suggestion system 105 to communicate over the network 104 with the user devices 102, and illustratively comprises one or more conventional transceivers.

The processor 120 further comprises a semantic correlation extractor 130, a function feature extractor 132, a code context representation generator 134, an API suggestion generator 136 and a snippet extractor 138.

It is to be appreciated that this particular arrangement of modules 130, 132, 134, 136 and 138 illustrated in the processor 120 of the FIG. 1 embodiment is presented by way of example only, and alternative arrangements can be used in other embodiments. For example, the functionality associated with the modules 130, 132, 134, 136 and 138 in other embodiments can be combined into a single module, or separated across a larger number of modules. As another example, multiple distinct processors can be used to implement different ones of the modules 130, 132, 134, 136 and 138 or portions thereof At least portions of the semantic correlation extractor 130, function feature extractor 132, code context representation generator 134, API suggestion generator 136 and snippet extractor 138 may be implemented at least in part in the form of software that is stored in memory 122 and executed by processor 120.

It is to be understood that the particular set of elements shown in FIG. 1 for automatically suggestion APIs involving user devices 102 of computer network 100 is presented by way of illustrative example only, and in other embodiments, additional or alternative elements may be used. Thus, another embodiment may include additional or alternative systems, devices and other network entities, as well as different arrangements of modules and other components.

By way of example, in other embodiments, the API suggestion system 105 can be eliminated and associated elements such as semantic correlation extractor 130, function feature extractor 132, code context representation generator 134, API suggestion generator 136 and snippet extractor 138 can be implemented elsewhere in the computer network 100.

An exemplary process utilizing semantic correlation extractor 130, function feature extractor 132, code context representation generator 134, API suggestion generator 136 and snippet extractor 138 of the API suggestion system 105 in computer network 100 will be described in more detail below.

Accordingly, as detailed herein, one or more embodiments of the invention can include suggesting and/or updating a list of APIs (for example, the top-K APIs at time "T" in a code editor-side view) with dependent API code context (such as surrounding data manipulations, dependent APIs and plumbing code) for every function to be coded (or currently being coded) based on the context of the function code written until a given time (time "T," for example) and the feature of the function to be implemented. As further detailed herein, the feature of the function can be derived (by component 132, for example) via implementing text analytics on comments and the method name, as well as by analyzing similar API usage patterns with respect to the current code context and feature from one or more application repositories.

Referring again to FIG. 1, the semantic correlation extractor 130 can analyze code snippets, from API source code data 107 in database 106, which have one or more semantic correlations with respect to a current code context ($C_i$) and a function feature to be coded ($F_i$). Across a corpus of programs, one or more embodiments of the invention can include iterating over each function (method) in each class (using, for example, an abstract syntax tree (AST) visitor pattern). For each method M, such an embodiment can include automatically identifying the action. By way of example, in a method named "startEngine( )," "start" is identified as the action, and in a method named "toString( )" "convert" is identified as the action. Additionally, at least one embodiment of the invention can include automatically identifying all methods invoked by M (using, for example, an AST visitor pattern). Further, one or more embodiments of the invention can include updating a database (such as database 106) to include a mapping between method actions and invoked methods.

By way of additional example, methods "findEmployee," "findContact," and "findStudent" can all have the following methods invoked: an openConnection to the database; a createStatement; an executeQuery; and a resultSet iteration and object access. Accordingly, an example embodiment of the invention can include building a mapping as follows: "find" → {openConnection, createStatement, executeQuery, . . . }. Note that the right-hand side is a list of lists (that is, there can be other such sequences). Further, each such list is associated with a frequency of occurrence in a relevant program corpus. Additionally, in an invoked method set, each method can also be associated with the class in which it is declared and the library to which it belongs.

As also detailed herein, one or more embodiments of the invention can include analyzing sample code for APIs. Such an embodiment can include collecting a set of methods that are in a list of invoked methods. For each method (that is, for each API with associated information of declaring class and containing library), such an embodiment can include performing a web search to obtain sample code, and/or examining API usage in client projects, test code for the library, etc. If a web search is to be performed, at least one embodiment of the invention can include obtaining sample code by extracting code snippets from the sample hypertext markup language (HTML) page, by using the HTML <code> or <pre> tags, and/or using one or more island parsers that allow extraction and parsing of partial code snippets from surrounding non-code text. This sample code can be stored, along with the API, for example, in a look-up table (API → sample code snippet).

Referring again to FIG. 1, the function feature extractor 132 can apply text analytics on the comments and the method name to extract the feature of the function ($F_i$) to be coded. Based on such analytics, at least one embodiment of the invention can include automatically identifying the method's envisaged action. For example, in startEngine, "start" is the action, and in toString, "convert" is the action. Similarly, one or more embodiments of the invention can include determining a method's action(s) from the leading comments (if any), for instance, by applying part-of-speech tagging to the comment and identifying verbs. For example, if the leading comment is "Starts an engine," such an embodiment can include extracting the method's action as "start" because of the verb "starts" (in the $3^{rd}$ person singular form, which is a traditional way of writing a method's intent).

As also illustrated in FIG. 1, the code context representation generator 134 derives and represents the current code context ($C_i$) of the function to be coded or currently being coding. The current code context can be represented, for example, by code representation techniques such as the abstract syntax tree, which facilitates identification of methods that are called by the current function, as well as control flow graphs and data flow graphs, which represent the control flow and data flow of a program and can assist in identifying the variables that are visible (available) at the present moment (as the code is being entered by the programmer).

For example, as the developer completes typing a method name, such as "String findStudent(String studentId)," and starts to code the method body, one or more embodiments of the invention can include extracting the method's action as "find." Further, such an embodiment can include representing the current code context ($C_i$) as including the parameter to the method, studentId, as well as all of the fields present in the class in which the method findStudent is declared (including a connection field, connection). Additionally, for partially completed methods, the code context ($C_i$) includes all previous lines until the beginning of the method, and can also include all variables that are visible at the current point in the code editor (obtained via data flow analysis).

Referring again to FIG. 1, the API suggestion generator 136, based on the current code context ($C_i$) of the function to be coded and the feature of the function ($F_i$) to be coded, recommends a given number (for example, the top-K) related APIs to be used for implementing the feature $F_i$ and state $C_i$ as suggestions in the code-editor side-view using the following steps. Additionally, based on analyzed code-snippets (such as previously detailed herein), the API suggestion generator 136 can extract the top-K APIs commonly used in the extracted code-snippets. Based on the frequency of the APIs used, and the correlation index with respect to $C_i$, at least one embodiment of the invention can include sorting the suggested APIs. Thus, in the above example of String findStudent(String studentId), such an embodiment can include recommending the following APIs: createStatement, executeQuery, hasNext, and next.

Further, as depicted in FIG. 1, the snippet extractor 138, for each suggested API, can extract sample code snippets (containing surrounding data manipulations, dependent APIs, and/or as plumbing code) containing the API in the context of given $C_i$ and $F_i$, and providing such sample code snippets as suggestions to the user. By way of example, for each chosen API, at least one embodiment of the invention can include suggesting code snippet via use of the current code context ($C_i$). For instance, if the user chooses the API createStatement from the statement class, then one or more embodiments of the invention can include extracting the associated sample code obtained for createStatement. In particular, this statement includes replacement of "con" with a suitable connection object (statement=con.createStatement( )). Further, if the current code context includes the field "connection of type Connection," then at least one embodiment of the invention can include generating the snippet (statement=connection.createStatement( )).

Figure 2:
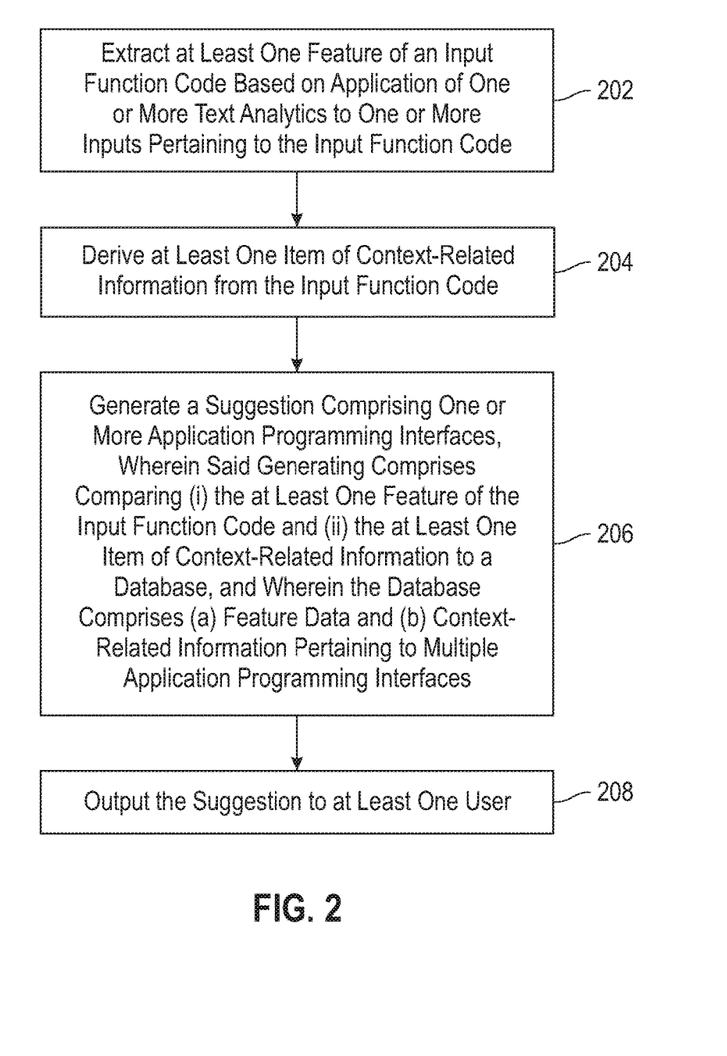
FIG. 2 is a flow diagram illustrating techniques according to an embodiment of the invention.

FIG. 2 is a flow diagram illustrating techniques according to an embodiment of the present invention. Step 202 includes extracting at least one feature of an input function code based on application of one or more text analytics to one or more inputs pertaining to the input function code. The one or more inputs pertaining to the input function code can include one or more comments pertaining to the input function code and/or a method name associated with the input function code.

Step 204 includes deriving at least one item of context-related information from the input function code. The at least one item of context-related information can include at least one item of context-related information of the input function code written prior to a designated time.

Step 206 includes generating a suggestion comprising one or more application programming interfaces, wherein said generating comprises comparing (i) the at least one feature of the input function code and (ii) the at least one item of context-related information to a database, and wherein the database comprises (a) feature data and (b) context-related information pertaining to multiple application programming interfaces. The application programming interfaces of the suggestion can include one or more application programming interfaces capable of being used to implement (i) the at least one feature of the input function code and (ii) the at least one item of context-related information.

Step 208 includes outputting the suggestion to at least one user. Outputting can include outputting the suggestion in a code-editor side-view.

The techniques depicted in FIG. 2 can also include prioritizing the one or more application programming interfaces within the suggestion based on the frequency of use of the one or more application programming interfaces. Additionally, the techniques depicted in FIG. 2 can also include updating the suggestion based on one or more additional items of input pertaining to the input function code. Updating can include adding one or more application programming interfaces to the suggestion based on the one or more additional items of input. Further, updating can also include removing one or more of the application programming interfaces from the suggestion based on the one or more additional items of input.

Also, the techniques depicted in FIG. 2 can additionally include extracting, for each of the one or more application programming interfaces of the suggestion, one or more portions of code related to the given application programming interface based on (i) the at least one feature of the input function code and (ii) the at least one item of context-related information. The one or more portions of code can include one or more instances of data manipulation related to the given application programming interface, one or more application programming interfaces dependent upon the given application programming interface, and/or plumbing code related to the given application programming interface. Further, at least one embodiment of the invention can include presenting, to a user, the one or more portions of code related to the given application programming interface upon selection of the given application programming interface by the user.

Also, an additional embodiment of the invention includes automatically identifying one or more features from each of multiple function codes, wherein each of the multiple function codes is associated with a particular application programming interface. Such an embodiment can also include automatically identifying one or more items of context-related information pertaining to each of the multiple function codes, and generating a database by storing (i) the one or more identified features and (ii) the one or more identified items of context-related information. Additionally, such an embodiment can include extracting at least one feature of an input function code based on application of one or more text analytics to one or more inputs pertaining to the input function code, and deriving at least one item of context-related information from the input function code. Further, such an embodiment can also include generating a suggestion comprising one or more application programming interfaces, wherein generating comprises comparing (i) the at least one feature of the input function code and (ii) the at least one item of context-related information to the generated database, and outputting the suggestion to at least one user.

At least one embodiment of the invention (such as the techniques depicted in FIG. 2, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives code snippets, a function feature to be implemented, and a current code context sent from a data source to the transmission server. The server can process the information, for example, based upon user-provided user preference information that is stored in memory on the server. Subsequently, an alert is generated containing API suggestions. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
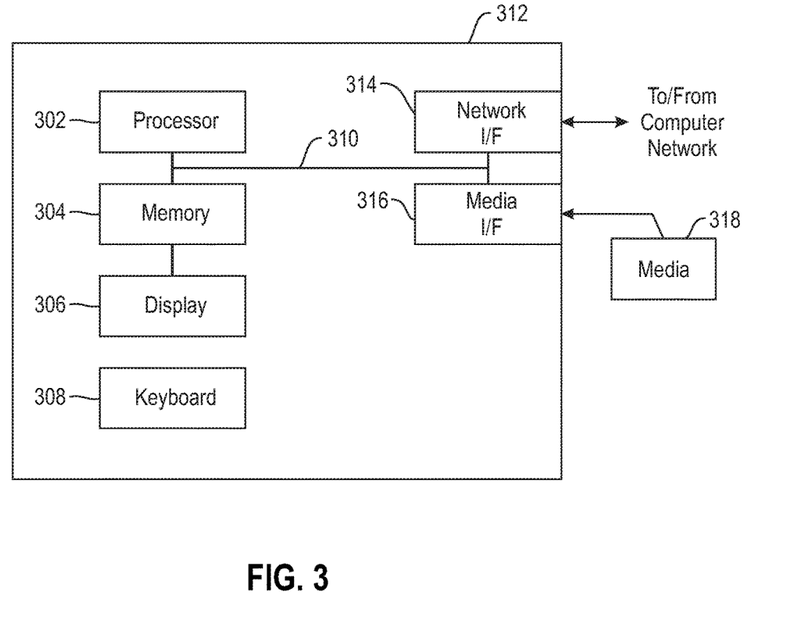
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
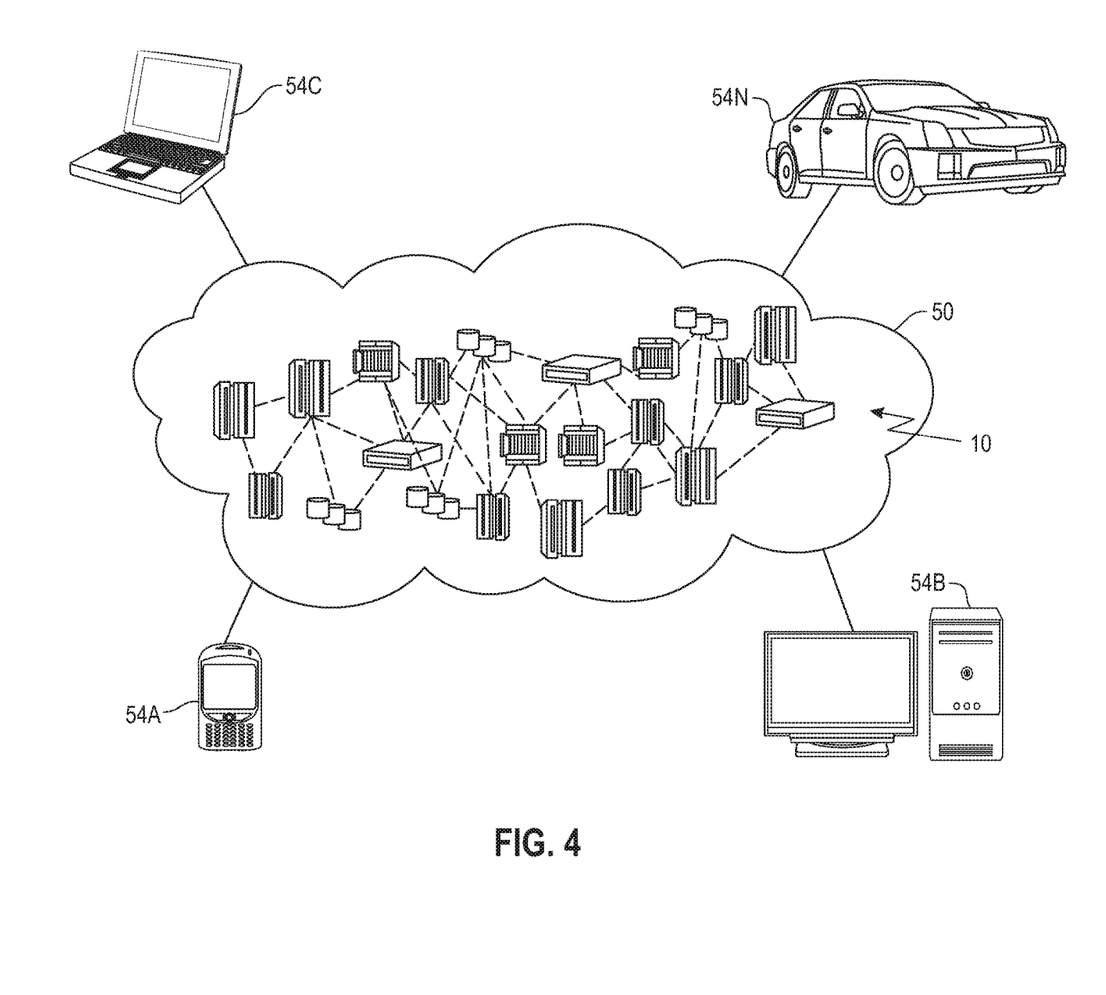
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
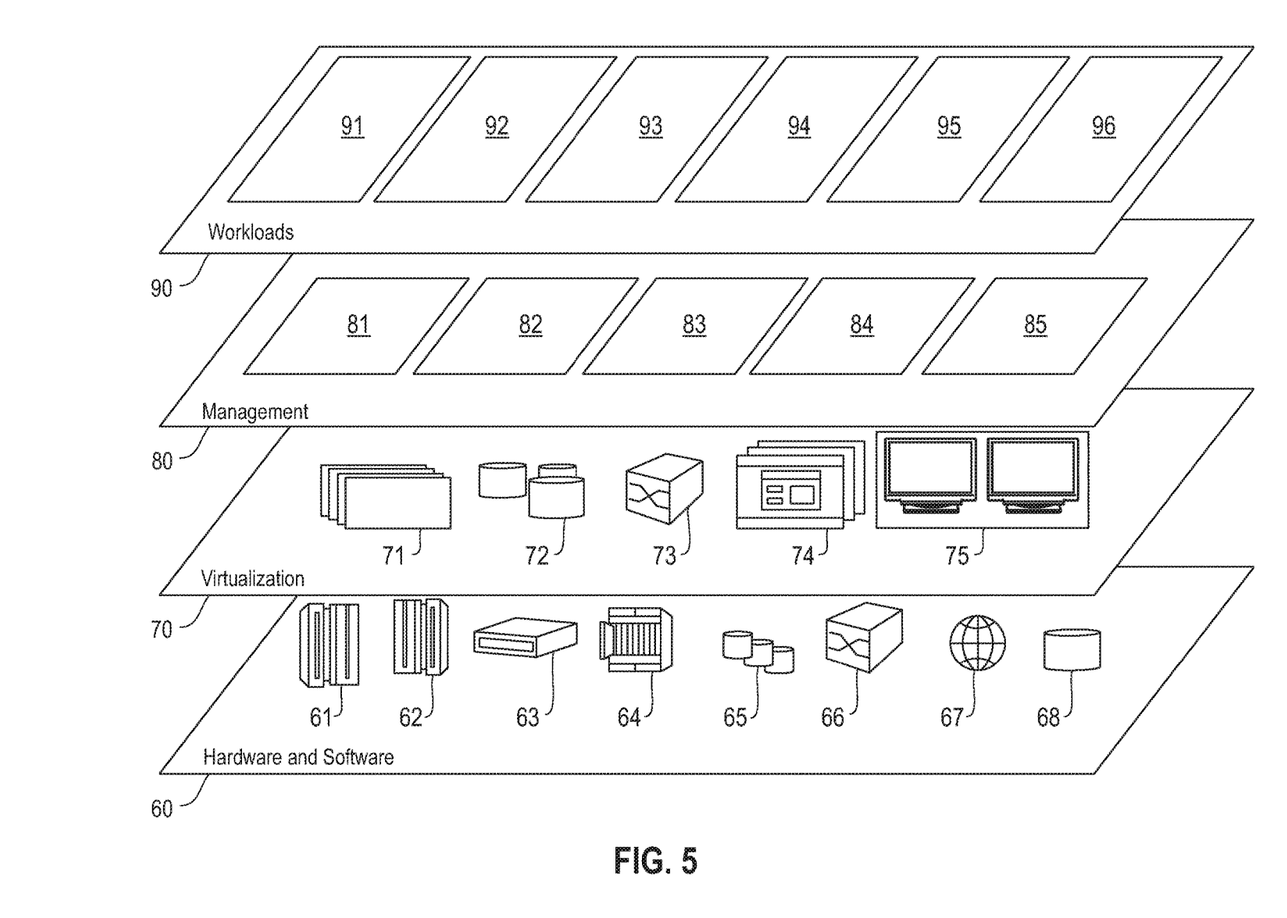
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API suggestion determination 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, dynamically updating API suggestions based on codes typed by a coder in a method space.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    extracting at least one feature of an input function code based on application of one or more text analytics to one or more inputs pertaining to the input function code, wherein said extracting comprises applying one or more natural language processing techniques to the input function code to infer (i) at least one action represented in the input function code and (ii) at least one argument of the at least one action represented in the input function code;
    deriving at least one item of context-related information from the input function code;
    generating a suggestion comprising one or more application programming interfaces, wherein said generating comprises comparing (i) the at least one feature of the input function code and (ii) the at least one item of context-related information to a database, and wherein the database comprises (a) feature data and (b) context-related information pertaining to multiple application programming interfaces;
    outputting the suggestion to at least one user, wherein said outputting comprises prioritizing the one or more application programming interfaces within the suggestion based on frequency of use of the one or more application programming interfaces, and wherein said outputting comprises outputting the suggestion in a code-editor side-view;
    updating the suggestion based on one or more additional items of input pertaining to the input function code; and
    outputting the updated suggestion to the at least one user in the code-editor side-view;
    wherein the method is carried out by at least one computing device.

2. The computer-implemented method of claim 1, wherein the one or more inputs pertaining to the input function code comprise one or more comments pertaining to the input function code.

3. The computer-implemented method of claim 1, wherein the one or more inputs pertaining to the input function code comprises a method name associated with the input function code.

4. The computer-implemented method of claim 1, wherein the at least one item of context-related information comprises at least one item of context-related information of the input function code written prior to a designated time.

5. The computer-implemented method of claim 1, wherein the one or more application programming interfaces of the suggestion comprise one or more application programming interfaces capable of being used to implement (i) the at least one feature of the input function code and (ii) the at least one item of context-related information.

6. The computer-implemented method of claim 1, wherein said updating comprises adding one or more application programming interfaces to the suggestion based on the one or more additional items of input.

7. The computer-implemented method of claim 1, wherein said updating comprises removing one or more of the application programming interfaces from the suggestion based on the one or more additional items of input.

8. The computer-implemented method of claim 1, comprising:
    extracting, for each of the one or more application programming interfaces of the suggestion, one or more portions of code related to the given application programming interface based on (i) the at least one feature of the input function code and (ii) the at least one item of context-related information.

9. The computer-implemented method of claim 8, wherein the one or more portions of code comprises one or more instances of data manipulation related to the given application programming interface.

10. The computer-implemented method of claim 8, wherein the one or more portions of code comprises one or more application programming interfaces dependent upon the given application programming interface.

11. The computer-implemented method of claim 8, wherein the one or more portions of code comprises plumbing code related to the given application programming interface.

12. The computer-implemented method of claim 8, comprising:
    presenting, to a user, the one or more portions of code related to the given application programming interface upon selection of the given application programming interface by the user.

13. A computer program product comprising a computer readable storage medium having program instructions embodied therewith, the program instructions executable by a device to cause the device to:
    extract at least one feature of an input function code based on application of one or more text analytics to one or more inputs pertaining to the input function code, wherein said extracting comprises applying one or more natural language processing techniques to the input function code to infer (i) at least one action represented in the input function code and (ii) at least one argument of the at least one action represented in the input function code;
    derive at least one item of context-related information from the input function code;
    generate a suggestion comprising one or more application programming interfaces, wherein said generating comprises comparing (i) the at least one feature of the input function code and (ii) the at least one item of context-related information to a database, and wherein the database comprises (a) feature data and (b) context-related information pertaining to multiple application programming interfaces;
    output the suggestion to at least one user, wherein said outputting comprises prioritizing the one or more application programming interfaces within the suggestion based on frequency of use of the one or more application programming interfaces, and wherein said outputting comprises outputting the suggestion in a code-editor side-view;
    update the suggestion based on one or more additional items of input pertaining to the input function code; and
    output the updated suggestion to the at least one user in the code-editor side-view.

14. The computer program product of claim 13, wherein the program instructions executable by a computing device further cause the computing device to:
    extract, for each of the one or more application programming interfaces of the suggestion, one or more portions of code related to the given application programming interface based on (i) the at least one feature of the input function code and (ii) the at least one item of context-related information.

15. A system comprising:
a memory; and
at least one processor operably coupled to the memory and configured for:
    extracting at least one feature of an input function code based on application of one or more text analytics to one or more inputs pertaining to the input function code, wherein said extracting comprises applying one or more natural language processing techniques to the input function code to infer (i) at least one action represented in the input function code and (ii) at least one argument of the at least one action represented in the input function code;
    deriving at least one item of context-related information from the input function code;
    generating a suggestion comprising one or more application programming interfaces, wherein said generating comprises comparing (i) the at least one feature of the input function code and (ii) the at least one item of context-related information to a database, and wherein the database comprises (a) feature data and (b) context-related information pertaining to multiple application programming interfaces;
    outputting the suggestion to at least one user, wherein said outputting comprises prioritizing the one or more application programming interfaces within the suggestion based on frequency of use of the one or more application programming interfaces, and wherein said outputting comprises outputting the suggestion in a code-editor side-view;
    updating the suggestion based on one or more additional items of input pertaining to the input function code; and
    outputting the updated suggestion to the at least one user in the code-editor side-view.

16. A computer-implemented method, comprising:
automatically identifying one or more features from each of multiple function codes, wherein each of the multiple function codes is associated with a particular application programming interface;

automatically identifying one or more items of context-related information pertaining to each of the multiple function codes;

generating a database by storing (i) the one or more identified features and (ii) the one or more identified items of context-related information;

extracting at least one feature of an input function code based on application of one or more text analytics to one or more inputs pertaining to the input function code, wherein said extracting comprises applying one or more natural language processing techniques to the input function code to infer (i) at least one action represented in the input function code and (ii) at least one argument of the at least one action represented in the input function code;

deriving at least one item of context-related information from the input function code;

generating a suggestion comprising one or more application programming interfaces, wherein said generating comprises comparing (i) the at least one feature of the input function code and (ii) the at least one item of context-related information to the generated database;

outputting the suggestion to at least one user, wherein said outputting comprises prioritizing the one or more application programming interfaces within the suggestion based on frequency of use of the one or more application programming interfaces, and wherein said outputting comprises outputting the suggestion in a code-editor side-view;

updating the suggestion based on one or more additional items of input pertaining to the input function code; and outputting the updated suggestion to the at least one user in the code-editor side-view;

wherein the method is carried out by at least one computing device.

* * * * *